(12) United States Patent
Göbel

(10) Patent No.: US 12,514,694 B2
(45) Date of Patent: Jan. 6, 2026

(54) DEVICE FOR SEALING BODILY ORIFICES, WITH NEUTRAL WEARING COMFORT

(71) Applicant: Advanced Medical Balloons GmbH, Waghäusel (DE)

(72) Inventor: Fred Göbel, Speyer (DE)

(73) Assignee: Advanced Medical Balloons GmbH (DE)

( * ) Notice: Subject to any disclaimer, the term of this patent is extended or adjusted under 35 U.S.C. 154(b) by 1242 days.

(21) Appl. No.: 17/059,064

(22) PCT Filed: May 23, 2019

(86) PCT No.: PCT/IB2019/054278
§ 371 (c)(1),
(2) Date: Aug. 11, 2021

(87) PCT Pub. No.: WO2019/229597
PCT Pub. Date: Dec. 5, 2019

(65) Prior Publication Data
US 2021/0369435 A1    Dec. 2, 2021

(30) Foreign Application Priority Data
May 28, 2018    (DE) .................... 10 2018 004 242.2

(51) Int. Cl.
*A61F 2/00*    (2006.01)
(52) U.S. Cl.
CPC .... *A61F 2/0013* (2013.01); *A61F 2210/0071* (2013.01)

(58) Field of Classification Search
CPC ...................... A61F 2/0013; A61F 2210/0071
(Continued)

(56) References Cited

U.S. PATENT DOCUMENTS 4,209,009 A * 6/1980 Hennig ................. A61F 2/0009
 604/374
6,485,476 B1 * 11/2002 von Dyck ............... A61F 5/441
 604/332

(Continued)

FOREIGN PATENT DOCUMENTS

DE    102005021081.3    8/2006
DE    102012003034     8/2012
(Continued)

Primary Examiner — Sunita Reddy
(74) Attorney, Agent, or Firm — Pandiscio & Pandiscio

(57) ABSTRACT

The invention relates to a device for the optimal organ-tolerable sealing, with minimal irritation, of bodily orifices, said device consisting of an extremely thin-walled, externally fillable balloon body having a central tube piece connecting the interior of the intestine to the perianal region of the anus, the tube piece being made of a soft-film-type material with a low volumetric expandability, wherein in a preferred design, one end of the balloon, which during the production process is completely formed to its required final dimensions, is reverse folded through the other end, and both balloon ends are tight-fittingly interconnected in the region of the outer bodily orifice and a thin-walled, adhesive-coated soft-film proximally adjoins the connection region of the two balloon ends, allowing direct fixation of the device to the skin and thus completely eliminating rigid, potentially irritating components in the region of the anal canal and in the perianal region.

22 Claims, 4 Drawing Sheets

(58) Field of Classification Search
USPC .................................................. 600/29–32
See application file for complete search history.

(56) References Cited

U.S. PATENT DOCUMENTS

| | | | | |
|---|---|---|---|---|
| 2002/0077611 | A1* | 6/2002 | von Dyck | A61F 5/442 |
| | | | | 604/332 |
| 2009/0043151 | A1* | 2/2009 | Gobel | A61F 2/0013 |
| | | | | 606/192 |
| 2009/0093784 | A1* | 4/2009 | Hansen | A61F 5/443 |
| | | | | 604/385.05 |
| 2009/0149880 | A1* | 6/2009 | Gobel | A61F 5/0093 |
| | | | | 606/192 |
| 2010/0114044 | A1* | 5/2010 | Cramer | A61F 5/448 |
| | | | | 604/332 |
| 2010/0249701 | A1* | 9/2010 | Gobel | A61B 17/3423 |
| | | | | 604/96.01 |
| 2011/0160657 | A1* | 6/2011 | Gobel | A61F 2/0013 |
| | | | | 604/328 |
| 2011/0306823 | A1* | 12/2011 | Gobel | A61F 2/0013 |
| | | | | 600/32 |
| 2014/0336569 | A1* | 11/2014 | Gobel | A61F 5/0093 |
| | | | | 604/101.05 |
| 2017/0043507 | A1* | 2/2017 | Göbel | B29C 49/4823 |
| 2017/0105827 | A1* | 4/2017 | Shalon | A61F 5/48 |

FOREIGN PATENT DOCUMENTS

| | | |
|---|---|---|
| WO | WO 2004/069057 | 8/2004 |
| WO | WO 2005/009292 | 2/2005 |
| WO | WO 2007/118621 | 10/2007 |
| WO | WO 2008/124717 | 10/2008 |
| WO | WO 2009/144028 | 12/2009 |

\* cited by examiner

DEVICE FOR SEALING BODILY ORIFICES, WITH NEUTRAL WEARING COMFORT

REFERENCE TO PENDING PRIOR PATENT APPLICATIONS

This patent application claims benefit of International (PCT) Patent Application No. PCT/IB2019/054278, filed 23 May 2019 by Creative Balloons GmbH for DEVICE FOR SEALING BODILY ORIFICES, WITH NEUTRAL WEARING COMFORT, which claims benefit of German Patent Application No. 10 2018 004 242.2, filed 28 May 2018.

The two (2) above-identified patent applications are hereby incorporated herein by reference.

FIELD OF THE INVENTION

For alert and oriented patients when using catheter products that dwell in or on the body, the problem frequently arises of the greatest possible irritation-free positioning that allows the wearer of the product the best possible wearing comfort and the lowest possible impairment of their physical movement. This applies in particular for catheter-like devices that are used for a sealing closure of bodily orifices, but also for catheters that establish a sealing connection from the inside of the body to the body's surface and are used for example for the closed, sealed supply and/or discharge of a substance.

BACKGROUND OF THE INVENTION

Especially in the case of physical labor or even sporting activities, there are a variety of directed relative movements between the sealing device and the structures and tissues that are directly exposed to it. The degree of resulting irritation can be experienced by the patient already after a few minutes as so bothersome that the use of the product is terminated and they refrain from further use.

In the following, the requirement for comfortable wearability based on a catheter-like device having a primarily sealing effect for a transitory anal seal for anorectally incontinent patients will be explained as an example.

Prior art devices for intermittent anal sealing are normally based on materials with a sponge-like consistency being positioned in the rectum and/or in the anal canal. By absorbing intestinal secretions, the sealing body that is initially dry and pressed to a small dimension swells to form mushroom-shaped or even shell-like formations. The patient frequently experiences these types of swelling bodies as a foreign body. In particular, trans-anal sealing bodies extending through the anal canal into the rectum can produce strongly irritating sensations and also lead to the triggering of an impulse to defecate.

In addition to swelling bodies, balloon-like sealing systems that are positioned rectally as well as trans-anally are also known. The sealing balloon components of these devices normally consist of elastically extensible materials, which expand during filling by the user starting from a specific manufactured dimension to a specific working dimension required for the function. Because of the relatively high filling pressures that adjust in the elastically expanded balloon, the patient experiences the majority of balloon-based seals as a foreign body and irritating in the rectum and anus. Known balloon-based devices for sealing the anus furthermore integrate a tube-like, relatively rigidly designed tube element, on which the rectally anchoring and sealing balloon body rests. In order to prevent the device from sliding into the rectum, the shaft tube can be augmented for example with a rectangular, T-shaped abutment, which fixes the device in the anal fold and prevents a corresponding luxation out of the trans-anal position. In addition, shaft-based balloon seals go hand in hand with a fundamental risk of injury to the intestine, if there are abrupt deflections of the device directed toward the patient and the rigid portion of the shaft that is required for the simple insertion of the sealing body possibly perforates the wall of the intestine. Because of the previously described disadvantages, none of these types of products have been able to be established in patient care till now.

In a similar way, the issue of the best possible wearing comfort arises while simultaneously maintaining the patient's ability to move unimpeded with the smallest possible risk of trauma during the course of use by patients who are treated with an artificially applied anus (stoma). In particular the sustained bending, straightening and torsion of the trunk can cause in a fixed way a high degree of subjective mistaken sensations for the patient on a balloon element applied to a catheter shaft.

As a result, devices that are constructed in a new way and combine optimum wearing comfort with the best possible sealing performance, and guarantee this even when the person is continuously physically active or even engaged in sports are desired by people who wear seal-like devices that are placed in or on the body on a sustained basis, and for supply lines or drainage tubes directed towards or away from the body. Systems are needed that have a high level of adjustment dynamics even in extreme physical positions or deflections from a resting position and that minimize the risk of injury in these types of extreme situations. In an ideal case, these types of systems make completely pressure-neutral and force-neutral placement in the body possible, which independently adapts to the forces and pressures prevailing in the respective organ, whereby, after a short phase of sensitive adaptation, the wearer is no longer aware of the device anymore and it can be worn neutrally. Despite this, the systems should be easy to insert and remove. In addition, the devices should have the simplest possible cost-effective structure.

SUMMARY OF THE INVENTION

To attain these multiple requirements, the present invention proposes a special combination of balloon film bodies that are designed to be extremely thin-walled and act simultaneously in a sealing and retaining manner, which are combined in a novel manner with soft-film-type, adhesively applied retaining structures on the body's surface, which dispenses with any sort of potentially irritating components that are perceived to be firm or rigid in the transitional area of the balloon body to the body's surface. In the process, the membrane-like, thin-walled materials described in the course of the invention ideally have a high mechanical stability with prevailing pressure and tension effects, which allows a combination of an extremely light and neutrally wearable design and simultaneous dimensional stability with variable mechanical stress, which is essential for the invention. The balloon films used are preferably already formed during production to a working dimension that is required for the sealing and/or retaining function. Alternatively, the balloon films can deliberately and conceptually exceed this specified working dimension in individual or even all sectional dimensions of the balloon body.

The likewise extremely thin-walled films which are adjacent in an adhesively fixed manner to the body's surface or the skin of the patient can optionally be coated with a gel-like material layer based on polyurethane for example, whereby the neutral wearing properties of the film bearing the gel does not change, but the handling, in particular the independent application of the thin-walled adhesive film by the user, is facilitated.

Combinations of micro-thin, completely formed, mechanically stable film bodies with abutment elements have already been described in DE 10 2005 021 081.3 for example. In this case, the balloon body is placed on a shaft element bearing the balloon body. A special inverting or fixing of the ends of the balloon on the shaft offset from each other produces an axially oriented counter-rolling with a sealing effect of the balloon placed in the body to the inner outlet of the bodily orifice. International (PCT) Patent Application Publication No. WO 2005/009292 and International (PCT) Patent Application Publication No. WO 2007/118621 also describe devices with very thin-walled, completely formed balloon bodies, wherein in this case one end of the balloon body is completely or almost completely reverse folded through the other end, and the two ends of the balloon are applied at approximately the same height at a sleeve-like support and end element. In this case, the sleeve element is placed extracorporeally or even in the access canal to the body and concludes the folded back balloon figure in a sealing manner as a fillable compartment. Similar to DE 10 2005 021 081.3, with this design, the balloon is also acted on with filling pressure to form an axially oriented rolling movement of the toroidal balloon body to the inner outlet of the bodily orifice.

The sleeve element in the embodiments described in International (PCT) Patent Application Publication No. WO 2005/009292 and International (PCT) Patent Application Publication No. WO 2007/118621 represents the structural connection of the balloon body to an extracorporeal cap element, and in another case, the sleeve is connected to a shaft-like catheter component, which facilitates the insertion of the device for the user.

The present invention avoids all components that have a firm or rigid consistency, wherein the film structure of the intra-corporally placed balloon body merges directly into the film structure of the extracorporeal retaining surface or without there being connecting functional elements with potentially irritating characteristics. The device according to the invention consists in particular in the region of the trans-anal and the pre-anal segment exclusively of thin-walled film components. The devices proposed as a part of the invention are all shaft-less in a wearing state. One end of the formed balloon film is preferably folded back through the balloon body and is connected in a tightly sealed manner to the other end of the balloon in the region of the transition to the body's surface or in the region of the transluminal access to the organ. This form of folding back produces a central, continuously open lumen or an access canal to the respective organ. The canal-like access can be used for example for the insertion of a retractable insertion aid. The canal furthermore allows the continuous venting of intestinal gas.

Connecting directly to the connecting region of the two ends of the balloon film is the retaining film or its propeller-like, wing-like or flap-like extensions for the adhesion on the inner sides of the buttocks. The retaining film can be produced as a separate film element, but also be directly molded on or formed in a merging manner in one of the ends of the balloon body.

The invention proposes in particular the combination of a micro-thin balloon body made of a thermoplastic polyurethane balloon film produced using blow molding, which is connected in turn to a retaining film consisting of thermoplastic polyurethane. The connection can be produced by adhesion or welding. The retaining film is preferably produced by deep drawing and has a neck-like or cone-like extension oriented towards the anus or even reaching into the anal canal, which facilitates a simple, precisely fitting joining on the concentric tube layers of the balloon body.

BRIEF DESCRIPTION OF THE DRAWINGS

Additional features, advantages and effects based on the invention are found in the following description as well as based on the drawing, which discloses preferred embodiments of the invention and shows:

FIG. 5a Special substrates affixed to the skin of the inner surfaces of the buttocks, on which the propeller-shaped or strip-shaped retaining films of the sealing device, which can be changed intermittently, can be fixed in an adhesive and reversibly detachable manner;

DETAILED DESCRIPTION OF THE PREFERRED EMBODIMENTS

Figure 1:
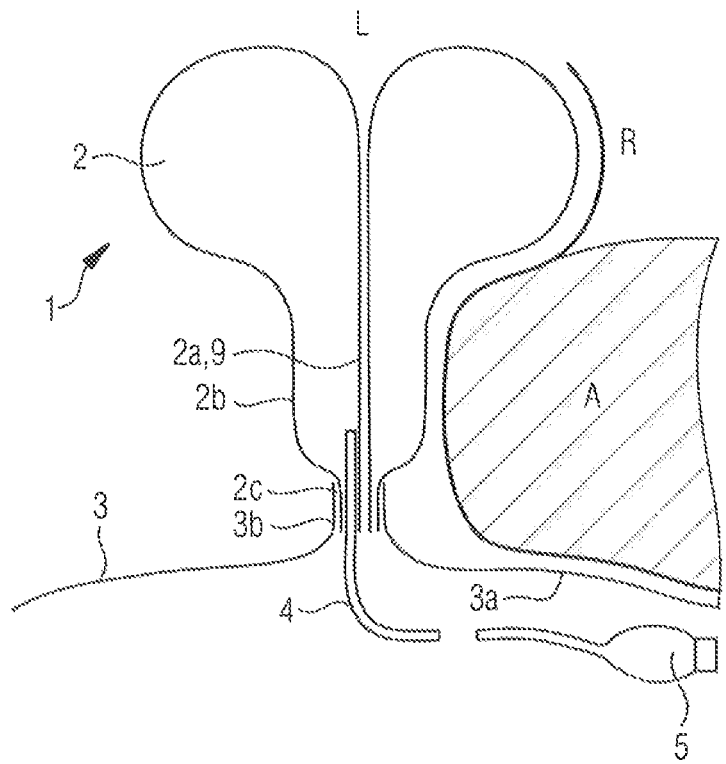
FIG. 1A completely folded back, shaft-less balloon body with a retaining film attached for the extracorporeal adhesion to the balloon body, using the example of a natural anus.

FIG. 1 shows a device 1 according to the invention, in particular in the form of an anal seal, consisting of a balloon body 2, whose two ends of the balloon 2a and 2b run parallel to each other and due to a corresponding equalization of the respective terminal diameters are tight-fittingly interconnected in the region 2c, forming a space that is fillable with a preferably gaseous medium, as well as furthermore consisting of an adhesively acting retaining film 3, which fixes the sealing device perianally on the inner sides of the buttocks of the patient and is thereby meant to prevent an undesired luxation of the device out of the trans-anal positioning, which acts in a sealing manner and is characteristic for the invention, into the rectum, such as is regularly observed without corresponding perianally fixing components, in particular when transitioning from a standing into a sitting posture of the patient.

The retaining film 3 connects directly and without a connecting or intermediary element to the proximal end of the filling body defined by the region 2c. The retaining film has an adhesive area 3a oriented towards the patient. It has a neck-like deep drawing 3b, which overlaps congruently with the inner or outer surface of the region 2c and is directly connected therewith by means of adhesion or welding. In the joining region 2c of the two ends of the balloon, a tube supply line 4 filling the balloon body is inserted in a sealing manner between the two concentric film layers or even tube layers, and a pilot balloon 5 with an integrated filler valve is attached on the end of said tube supply line.

The positioning of the seal in or on the patient takes place in such a way that the two concentrically running ends of the balloon 2a and 2b run through the anus A and the toroidal balloon body 2 rests on the base of the rectum R. The trans-anal segment of the balloon body yielded by the two ends of the balloon is tapered in diameter relative to the rectally positioned torus. The diameter of the end of the balloon 2b is configured to be preferably approx. 15 to 30 mm, especially preferably to be 20 to 25 mm. The diameter of the inside end of the balloon 2a is at approx. 15 mm and in an ideal case allows the accommodation of the device on the user's finger or the digital trans-anal insertion of the balloon body. As an alternative to an end of the balloon 2a emerging directly from the balloon or being formed in one piece, the central lumen L, which continuously connects the distal end of the balloon to the proximal end of the balloon, can also be produced by a separately produced tube segment 9.

The balloon body is preferably filled incompletely in situ. The filling volume used is approximately 80% of the volume of the freely formed or freely developed balloon body. The balloon thus merges into a flaccid, tensionless filling level that is especially advantageous for the functioning of the device. In a flaccid state, the balloon body absorbs the respective prevailing rectal force, but does not itself transfer any permanently acting force to the anatomical structures and tissue adjacent to it. The filling pressure prevailing in the balloon behaves almost time synchronously to the pressures acting rectally or abdominally, and thus guarantees a continuously acting, sealing development of the trans-anally positioned outer end of the balloon 2b, which development is oriented towards the mucous membrane of the anal canal. In the meantime, due to the action of force of the filling pressure prevailing in the balloon body, and provided there is a corresponding deformability, the central lumen L formed by the inner end of the balloon 2a, collapses in a manner that almost seals the lumen.

Figure 2A:
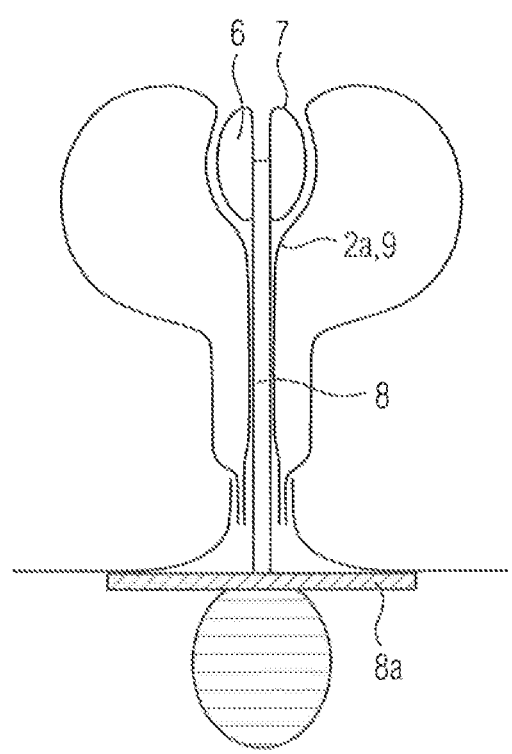
FIG. 2a A device corresponding to the embodiment in FIG. 1, wherein the distal end of the balloon is equipped there with a fixed olive-shaped insertion element as well as a retractable insertion aid.

FIG. 2a shows an embodiment of the device corresponding to FIG. 1, wherein an olive-like insertion element 6 is firmly inserted into the distal or front opening of the lumens L, which insertion element has a central canal 7, into whose proximal end a rod-like insertion aid 8 that can be retracted out of the olive is inserted. The inner layer 2a of the device can alternatively be produced as a separately formed tube film element 9, which attaches proximally to the olive, and connects in a tightly fitting manner in the region 2c to the outer layer 2b.

The insertion aid 8 can be provided with a discoid and/or plate-like element 8a, which through a mechanical limit stop of the discus on the anus, indicates the correct insertion depth to the user for inserting the device. In doing so, the retaining film 3 rests distally on the element 8a, i.e., oriented towards the patient.

Figure 2B:
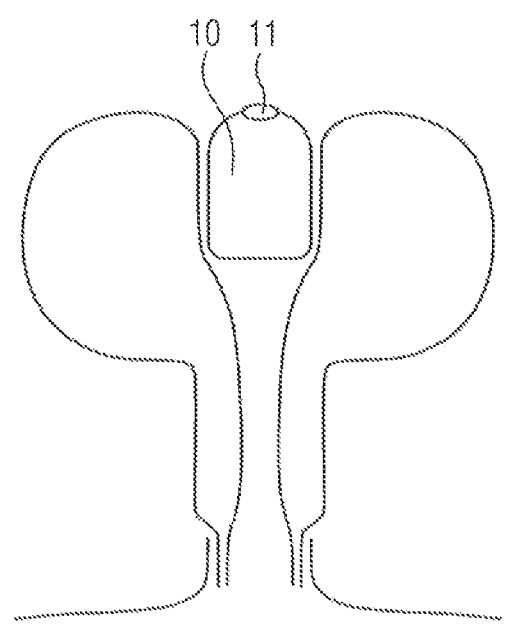
FIG. 2b A device that corresponds in terms of its structure to that of FIG. 2a, wherein the distal end of the balloon integrates a finger cot-like insertion element.

FIG. 2b shows a design corresponding to FIG. 2a, wherein a finger cot-like element 10 is inserted into the distal opening of the lumen L in a firmly connecting manner, into which finger cot-like element the distal phalanx of the inserting finger can be inserted. The finger cot 10 is provided preferably with an opening 11 on the distal end for the decompression of intestinal gas. The opening can be provided with a gas permeable, but liquid repellent fleece.

Figure 2C:
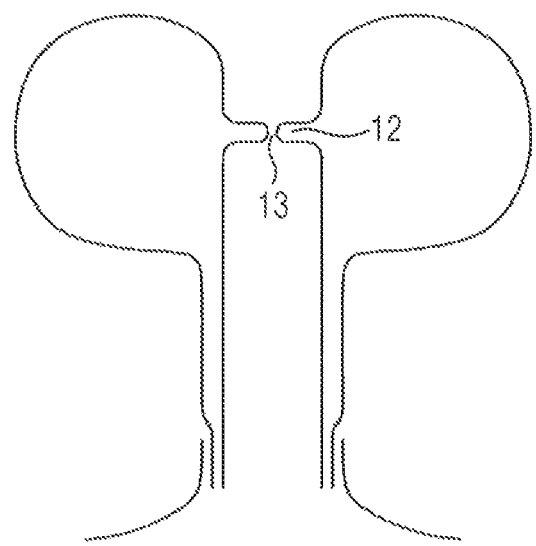
FIG. 2c A modification of the design according to FIG. 2b, wherein the device is likewise picked up by the user's finger and thereby inserted digitally.

FIG. 2c shows a design corresponding to FIG. 1 and FIG. 2b, wherein a narrow section 12 is formed in the distal region of the lumen L in the inner layer or the inner end of the balloon 2a, which also allows the insertion of a finger holding the device. The lumen 13 in the region of the narrow section allows for the continuous outlet of intestinal gas.

Figure 3A:
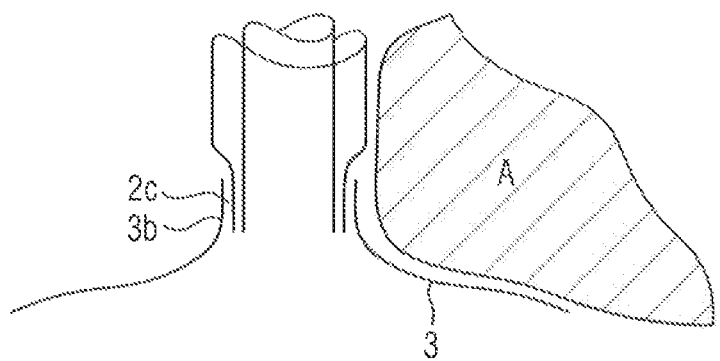
FIG. 3a The transition of the balloon film into the retaining film as a part of an exemplary embodiment.

FIG. 3a shows the transition of the ends of the film of the balloon body into the pre-anally retaining balloon film 3 in detail. In the region 2c, the neck-like or funnel-like extension 3b of the retaining film adjoins from the outside or from the inside. The transitional region is preferably placed in the outer third of the anal canal A. The especially pressure-sensitive perianal area of the anus is thereby exposed merely to the retaining film 3, and not to the joining region of the ends of the balloon with the retaining film. The neck-like extension 3b of the retaining film can be formed into the film during production, e.g., by a corresponding deep drawing method.

Figure 3B:
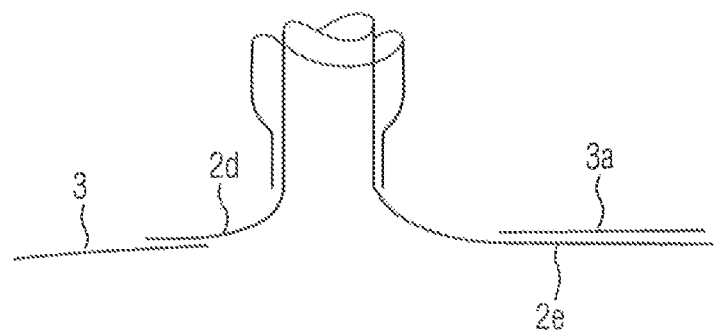
FIG. 3b A further embodiment of the film transition.

FIG. 3b shows further embodiment options of the transition from the balloon film and the retaining film. Thus, a flange-like extension 2d can be formed on the proximal end of the inner end of the balloon 2a, on which extension the retaining film 3 is in turn flange-mounted. The flange 2d should have a diameter of approx. 4 to 5 cm in order to guarantee that the two-layer connection surface of the connecting region is positioned at an adequate distance from the perianal area. Alternatively, the flange 2e can be formed to be so large in diameter that it no longer needs any further retaining film 3 and the adhesive 3a can then be applied directly to the inner side of the flange oriented towards the patient. The adhesive surface, which is coated with adhesive, should have at least a distance of 15 mm from the edge of the perianal area.

Figure 4:
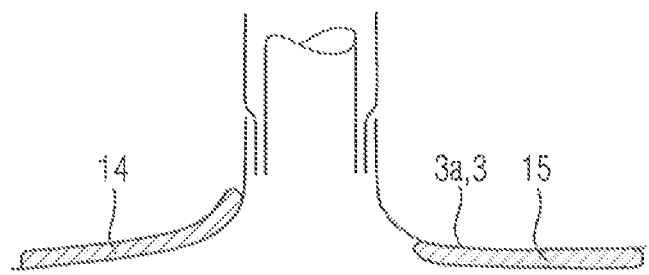
FIG. 4A combination of the retaining film with a gel-like substance modifying the haptics of the retaining film.

FIG. 4 shows a special combination of the retaining film 3 with an adhesively acting, gel-like substance 14, 15. A gel 14 can be applied to the side facing the patient or a gel 15 can be applied to the side facing away from the patient. If the gel 14 is pointing toward the patient, adhesive properties can be achieved with polyurethane-based gels for example that are adequate for the adhesion of the device to the skin of the patient. The advantageous effect of the gels consists of its tissue-like quality and a good, less irritating skin tolerability. If the gel 15 is applied to the side facing away from the patient, both the manual application as well as the detachment or removal of the retaining film 3 from the skin by the patient can be facilitated by a corresponding gel-like surface or partial surface. For this purpose, the gel 15 is provided on the side facing away from the patient with a suitable coating or enclosure, which uses the natural adhesion of soft PUR gels.

Figure 5:
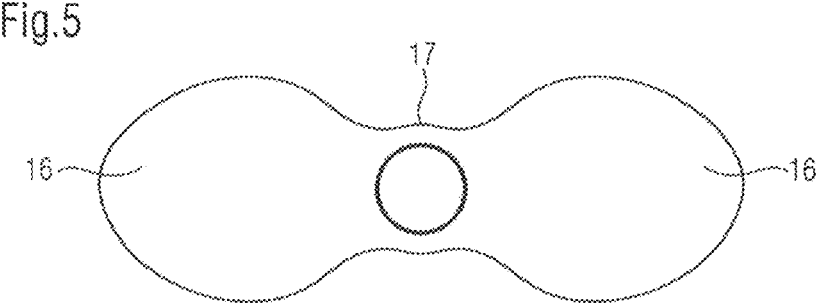
FIG. 5A special, propeller-shaped embodiment of the retaining film for the fixation of the sealing device on the perianal skin of the inner surfaces of the buttocks.
FIG. 5b A special embodiment of an insertion aid for determining the correct anorectal insertion depth and for simplified affixing of the lateral wings or extensions on the perianal skin or substrate.
FIG. 5c A further view of the insertion aid shown in FIG. 5b.

FIG. 5 shows a propeller-like retaining surface 16 that is cut especially advantageously for less irritating wearing comfort, whose two wings are respectively affixed to the perianal skin of the buttocks adjacent to the perianal area. The center especially narrow portion 17 lies immediately in front of the anus. Because of the narrowing of the lateral wings towards the center portion 17, shearing or twisting effects of the buttocks can largely be prevented when moving towards the portion of the sealing device that is positioned anally or trans-anally. The decoupling of gluteal movements or mass movements of the body from the retaining and sealing balloon body is crucial for a most neutral possible wearing sensation for the user.

Figure 5A:
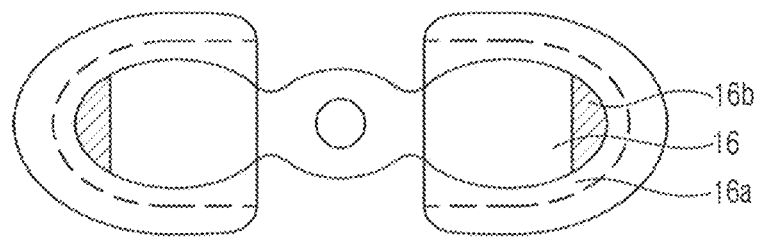

FIG. 5*a* deals in particular with the comfort when detaching the adhesive retaining film from the patient. In order to prevent a painful detachment of the adhering film from the sensitive perianal skin, flat substrates 16*a* are affixed perianally to both parts of the gluteal skin, said substrates consisting of a preferably transparent film material that is suitable for a sustained skin exposure. For the substrates, the invention prefers adhesive films with properties such as those that are offered for example by the manufacturer, 3M Health Care, in the form of the Tegaderm Absorbent product. The product has a central, flat section which has a prominent wall thickness and increased rigidity towards the surrounding edge, and thereby facilitates the tactile perception of the region of the substrate that is especially favorable for anchoring the retaining film. If the user has a direct view of the perianal region when inserting and fixing the balloon seal, for example by using a mirror, the relative positioning of the retaining film on the substrate is furthermore facilitated by a coloration of the substrate 16*a* in the region of this favorable positioning.

The described adhesive film substrate 16*a* consists preferably of a hydrocolloidal, breathable material, is waterproof and permits both regular showering and a normal anal toileting. Due to the transparency of the material, reactive changes to the skin can be detected easily, as the case may be.

The propeller-shaped or even strip-shaped retaining films 16 are affixed to the two substrates 16*a*, which can remain positioned perianally over several days and up to a week. In the process, the adhesive effect of the substrate 16*a* on the skin of the patient is greater than the adhesion of the retaining film to the substrate. Furthermore, the contour of the substrate 16*a* should overlap the contour of the extensions 16 of the retaining film 3 being fixed, in order to thereby guarantee that the retaining film takes place on the substrate with a certain degree of security during application by the patient. For technology of this sort, in particular polyurethane-based gels that are applied in very thin layers and permit for instance a Post-it Note-like removal effect from the underlying film are suitable for an adhesive for fixation between the retaining film 3 and the substrate. An overall moderately effective adherence to the described film substrate is adequate for preventing the described luxation of the sealing device out of the trans-anal position into rectum.

To facilitate the detachment of the propeller-shaped or strip-shaped retaining film from the substrate, the ends of the film extensions 16 are provided with a non-adhesive film region 16*b*, which can be easily grasped by the user.

Figure 5B:
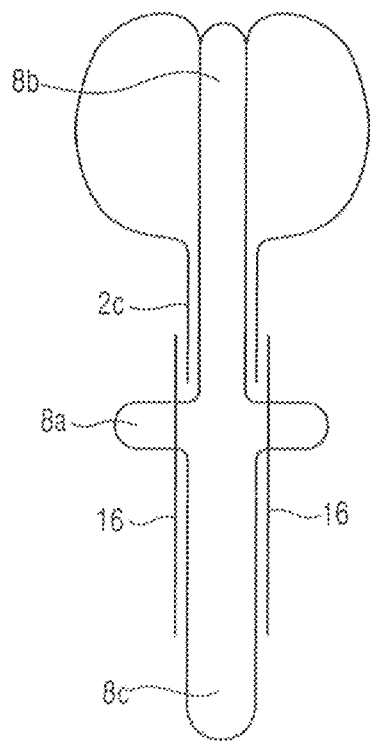
Figure 5C:
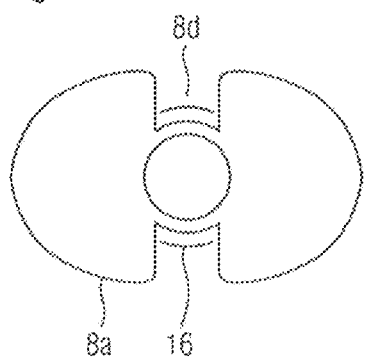

FIG. 5*b* shows a special design of a sealing device according to the invention, wherein the sealing body to be positioned rectally and trans-anally is placed on a finger-like element 8*b*, and the insertion depth is predetermined for the user by a flange-like, plate-like or discoid limit stop 8*a*. In the proximal direction, oriented away from the patient, the finger-like element merges into a hand grip 8*c*, which makes the manual insertion into the anus easier. The limit stop has two mutually oppositely disposed recesses 8*d*, into which the retaining films 16 to be affixed to the buttocks are inserted parallel to the hand grip. The inserting hand thereby grasps the hand grip together with the retaining films, whereby the retaining films do not hinder the anal insertion of the device. After the discus determining the insertion aid makes impact with the anus, the retaining films 16 are folded out of the recesses 8*d* and, after a protective film is removed or peeled off, they are affixed to the buttocks. The finger-like element 8*b* is then pulled out of the central lumen L of the balloon body and removed.

Figure 6:
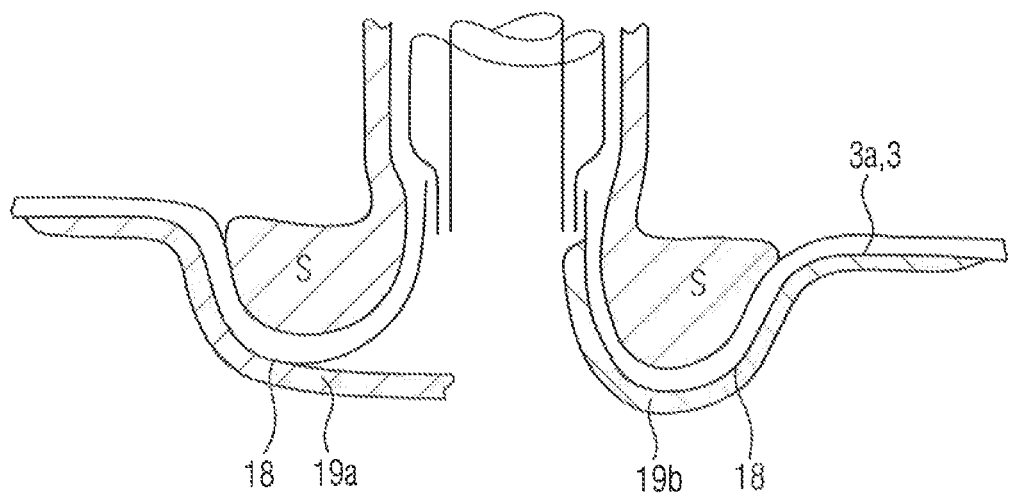
FIG. 6A corresponding embodiment for the intermittent, sealing seal of an artificial anus (stoma); as well as FIG. 6a An adhesively applied substrate that is cut to be circular or tire-shape for example for use with ileostomies.

FIG. 6 shows a special design of the retaining film 3 for the sealing of artificial anuses, in particular of so-called ileostomies, which establish a direct connection of the small intestine of a patient to the abdominal skin surface. The retaining film 3 or 18 in this case is extended in a depressed and bell-like manner. The depression accommodates the intestinal segment S of the stoma that is folded over on the abdominal wall and adheres there. The outer side of the film 3 in this case can be surrounded by a protective gel layer 19, which optionally lies cap-like or dome-like 19*a* over the external stoma, or follows and nestles against the bell-shaped contour 19*b* of the film.

Figure 6A:
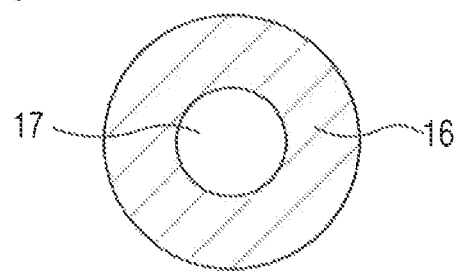

FIG. 6*a* shows a stoma-compliant variant of a substrate 16*a*, which facilitates the detachment of the sealing device from the peri-stomal skin. In this case, it is cut out to be circular and consists preferably of a very thin-walled, breathable, waterproof and washable film, which is analogous to the substrate described in FIG. 5*a*. The substrate allows the sealing body that is positioned in the stoma to be detached from the perianal skin in a manner that is atraumatic and free of plain. The substrate is manufactured in various circular opening diameters 16*c*. It also has a non-adhesive edge section 16*b*, which can be grasped safely by the patient and allows the foil to be peeled off of the film.

The balloon body is preferably filled with a specific, predetermined air volume. To this end, the user uses a conventional syringe for example, which is provided with a corresponding volume mark. The volume for the filling of the balloon body is determined in such a way that the balloon fills only partially, and thus remains in a flaccid, tensionless state. In situ the balloon filled in this manner nestles against the individual anorectal anatomy of the patient in an optimally sealing manner. The filling pressure that respectively adjusts in the balloon corresponds in an approximate way to the respectively prevailing rectal pressure. This is normally achieved with the fill volume that corresponds to approx. 70 to 80% of the freely formed balloon body of the application-ready device.

As an alternative, the sealing device can also be adjusted in a pressure-controlled manner with a customary manual pump pressure gauge for example. The pressures that are required for the sealing function must then be determined individually.

LIST OF REFERENCE NUMBERS

| List of Reference Numbers | |
| --- | --- |
| 1 | Device |
| 2 | Balloon body |
| 2a | End of the balloon |
| 2b | End of the balloon |
| 2c | Region, joining region |
| 2d | Flange-like extension |
| 3 | Retaining shoulder |
| 3a | Adhesive area |
| 3b | Funnel-like extension |
| 4 | Tube supply line |

-continued

| List of Reference Numbers | |
|---|---|
| 5 | Pilot balloon |
| 6 | Insertion element |
| 7 | Central canal |
| 8 | Insertion aid |
| 8a | Plate-like element |
| 8b | Finger-like element |
| 8c | Hand grip |
| 8d | Recess |
| 9 | Tube segment |
| 10 | Finger cot |
| 11 | Opening |
| 12 | Narrow section |
| 13 | Lumen |
| 14 | Side |
| 15 | Side |
| 16 | Retaining surface |
| 16a | Substrate |
| 16b | Film region |
| 16c | Opening diameter |
| 17 | Portion |
| 18 | Retaining film |
| 19 | Gel layer |
| 19a | Dome, cap |
| 19b | Bell-shaped contour |
| A | Anus, anal canal |
| L | Lumen |
| R | Base of the rectum |
| S | Intestinal segment |

The invention claimed is:

1. A device for the optimal organ-tolerable sealing, with minimal irritation, of a lumen leading as an ostium in a region of the surface of the body of a patient, consisting of a thin-walled, externally fillable balloon body made of a soft-film-type material which has a central lumen, which extends from the distal to the proximal end of the device wherein:
   a) the balloon body is produced by (i) equalizing respective terminal diameters of two ends of a balloon blank that initially is tube-shaped in a manner that the ends are tight fitting within each other, (ii) everting one end of the balloon blank inwardly, (iii) guiding said one end through the other end of the balloon blank, (iv) interconnecting said two ends of the balloon guided into each other in a tightly sealed manner directly to each other in a manner as to produce an externally fillable space without any rigid, potentially irritating components in the region of the ostium as well as in the adjoining, extracorporeal region and wherein b) at least one flat retaining shoulder comprising a thin, membrane-like soft film coated with a skin-tolerable adhesive adjoins the proximal end of the balloon body allowing a direct fixation of the device to the skin of the patient.

2. The device according to claim 1, wherein, during production, the balloon body is completely formed to its required dimensions.

3. The device according to claim 1, wherein the cavity of the balloon towards the surrounding lumen is completed by a layer of a soft-film-type material.

4. The device according to claim 3, wherein the layer of soft-film-type material delimiting the cavity of the balloon towards the surrounding lumen is connected to or integrally formed with the outer sheath of the balloon body.

5. The device according to claim 1, wherein the two ends of the balloon guided into each other are connected to each other in a tightly sealed manner in the transostial or in the transluminal region or in the directly adjoining extracorporeal region.

6. The device according to claim 5, wherein the two ends of the balloon guided into each other are directly connected to each other without any sleeve interposed therebetween and without any other spacing element.

7. The device according to claim 1, wherein existing, extracorporeal regions of the balloon body are not expanded radially with respect to a transostial balloon section.

8. The device according to claim 1, wherein the balloon body is produced by blow molding.

9. The device according to claim 8, wherein the balloon body is produced by blow molding from a thermoplastic polyurethane film.

10. The device according to claim 1, wherein the retaining shoulder consists of thermoplastic polyurethane.

11. The device according to claim 1, wherein the retaining shoulder is produced by deep drawing.

12. The device according to claim 1, wherein the retaining shoulder is coated with a gel-like material layer or with a gel-like material layer based on polyurethane.

13. The device according to claim 1, wherein the retaining shoulder has a flap-like, wing-like or propeller-like base area comprising one or more flaps or wings projecting approximately radially away from the proximal end of the balloon.

14. The device according to claim 1, wherein the retaining shoulder has a symmetrical base area comprising two projections lying approximately diametrically opposite from each other.

15. The device according to claim 1, wherein the retaining shoulder attaches directly to a connecting region of the two ends of the balloon film.

16. The device according to claim 1, wherein the retaining shoulder molded on or formed in a merging manner in one of the ends of the balloon body.

17. The device according to claim 1, wherein the retaining shoulder is produced as a separate film element.

18. The device according to claim 1, wherein the retaining shoulder has a neck-like or cone-like extension oriented towards the ostium or even reaching into the ostium or lumen, which facilitates a simple, precisely fitting joining on the concentric tube layers of the balloon body.

19. The device according to claim 1, wherein the retaining shoulder is connected to a balloon structure, without the use of an especially rigid connecting or functional body.

20. The device according to claim 1, wherein a connection between the balloon body and the retaining shoulder is produced by adhesion or welding.

21. A device for an optimal organ-tolerable sealing, with minimal irritation, of a lumen leading as an ostium in a region of the surface of a natural or artificial anus of a patient, consisting of a thin-walled, externally fillable balloon body made of a soft-film-type material, which has a central lumen, which extends from the distal to the proximal end of the device and allows a continuous venting of intestinal gas or allows an insertion of a retractable insertion aid, wherein
   a) the balloon body is produced by (i) equalizing respective terminal diameters of two ends of a balloon blank that initially is tube-shaped in a manner that the ends are tight fitting within each other, (ii) everting one end of the balloon blank inwardly, (iii) guiding said one end through the other end of the balloon blank, (iv) interconnecting said two ends of the balloon guided into each other in a tightly sealed manner directly to each other in a manner as to produce an externally fillable space without any rigid, potentially irritating components in the region of the ostium as well as in the adjoining, extracorporeal region, and wherein b) at least one flat retaining shoulder comprising a thin, membrane-like soft film coated with a skin-tolerable adhesive adjoins the proximal end of the balloon body allowing a direct fixation of the device to the skin of the patient.

22. A device for an optimal organ-tolerable sealing, with minimal irritation, of a lumen leading as an ostium in a region of the surface of a natural or artificial anus of a patient, consisting of a thin-walled, externally fillable balloon body made of a soft-film-type material, which has a central lumen, which extends from the distal to the proximal end of the device and allows a continuous venting of intestinal gas or allows an insertion of a retractable insertion aid, wherein a) the balloon body is produced by (i) equalizing respective terminal diameters of two ends of a balloon blank that initially is tube-shaped in a manner that the ends are tight fitting within each other, (ii) everting one end of the balloon blank inwardly, (iii) guiding said one end through the other end of the balloon blank, and (iv) interconnecting said two ends of the balloon guided into each other in a tightly sealed manner directly to each other in a manner as to produce an externally fillable space without any rigid, potentially irritating components in the region of the ostium as well as in the adjoining, extracorporeal region, and wherein b) at least one flat retaining shoulder without any component of firm or rigid consistency adjoins the proximal end of the balloon body and consists of a thin, membrane-like soft film coated with a skin-tolerable adhesive allowing a direct fixation of the device to the skin of the patient.

* * * * *